US011303628B2

(12) United States Patent
Martick (10) Patent No.: US 11,303,628 B2
(45) Date of Patent: Apr. 12, 2022

(54) SOFTWARE DEPLOYMENT CERTIFICATION

(71) Applicant: SAP SE, Walldorf (DE)

(72) Inventor: Christian Martick, Wendisch Rietz (DE)

(73) Assignee: SAP SE, Walldorf (DE)

( * ) Notice: Subject to any disclaimer, the term of this patent is extended or adjusted under 35 U.S.C. 154(b) by 221 days.

(21) Appl. No.: 16/685,754

(22) Filed: Nov. 15, 2019

(65) Prior Publication Data
US 2021/0152544 A1 May 20, 2021

(51) Int. Cl.
*H04L 29/06* (2006.01)
*G06F 8/61* (2018.01)
*G06F 21/44* (2013.01)

(52) U.S. Cl.
CPC ............ *H04L 63/0823* (2013.01); *G06F 8/61* (2013.01); *G06F 21/44* (2013.01)

(58) Field of Classification Search
CPC ................................. G06F 21/44; G06F 21/50
See application file for complete search history.

(56) References Cited

U.S. PATENT DOCUMENTS

| 7,930,733 | B1* | 4/2011 | Iftode | ................... G06F 21/575 726/5 |
| 9,756,074 | B2* | 9/2017 | Aziz | ....................... G06F 21/56 |
| 2004/0199787 | A1* | 10/2004 | Hans | ..................... G07F 7/1008 726/27 |
| 2016/0092701 | A1* | 3/2016 | Shah | ................... H04L 63/0823 713/189 |

\* cited by examiner

*Primary Examiner* — Jason K Gee
(74) *Attorney, Agent, or Firm* — Fountainhead Law Group P.C.

(57) ABSTRACT

The present disclosure pertains to validation of runtime objects for a software deployment using a certificate. After creating the runtime objects during a build process, a certificate may be generated based on the runtime objects. The certificate may include a fingerprint of the runtime objects that may be used before deployment to determine whether the runtime objects have been changed. Before deployment, the runtime objects and the certificate may be obtained and the certificate may be validated. In addition, the runtime objects may be validated using the fingerprint included in the certificate. For instance, the fingerprint may be re-generating based on the runtime objects for deployment. The runtime objects may be validated by comparing the re-generated fingerprint to the fingerprint in the certificate. The runtime objects may be deployed if the certificate and the runtime objects are valid.

14 Claims, 6 Drawing Sheets

SOFTWARE DEPLOYMENT CERTIFICATION

BACKGROUND

The present disclosure relates to computing and data processing and in particular to validating software deployments.

As software applications grow larger and more complex, the corresponding software development process may also become larger and more complex. Complex software development processes may involve numerous iterations of planning, designing, building, and testing of the software before the release and deployment of the software. Furthermore, even once the software has been released, software development may continue in order to maintain and upgrade the software. Such maintenance and upgrades may also involve numerous iterations of planning, designing, building, and testing of the software updates before they are released and deployed. In some situations, there may be weeks or months between software updates are released, with each update may including numerous different runtime packages to be updated, where each runtime package may be based on different design-time objects. Given this situation, it may be difficult to keep track of which runtime objects are to be deployed for a particular software release or update and it may be difficult to ensure that the runtime objects are complete and correct.

The present disclosure addresses these issues and others, as further described below.

SUMMARY

The present disclosure provides a computer-implemented method. The method includes obtaining a first set of runtime objects. The runtime object may be used for executing a software application. The method further includes obtaining a first list of runtime objects. The method further includes obtaining a first certificate including a first fingerprint. The method further includes determining whether the first certificate is valid. The method further includes generating a second fingerprint based on the first list and the first set of runtime objects. The method further includes comparing the second fingerprint to the first fingerprint. The method further includes determining whether the first set of runtime objects is valid based on the comparing of the second fingerprint to the first fingerprint. The method further includes deploying the first set of runtime objects to a target system. The deployment being based on the determination of whether the first certificate is valid and the determination of whether the first set of runtime objects is valid.

The present disclosure also provides another computer-implemented method. The method includes obtaining a second set of runtime objects. The second set of runtime objects may be used for executing a software application. The method further includes obtaining a second list identifying the second set of runtime objects. The second set of runtime objects may be generated using a third set of design-time objects. The method further includes generating a second fingerprint based on the second list and the second set of runtime objects. The method further includes generating a second certificate including the second fingerprint. The second certificate may be usable to determine whether the second set of runtime objects is valid based on the second fingerprint.

The present disclosure also provides a non-transitory machine-readable medium storing a program. The program is executable by at least one processing unit of a device. The program includes sets of instructions for obtaining a first set of runtime objects. The runtime object may be used in executing a software application. The program further includes instructions to obtain a first list of runtime objects. The program further includes instructions to obtain a first certificate including a first fingerprint. The program further includes instructions to determine whether the first certificate is valid. The program further includes instructions to generate a second fingerprint based on the first list and the first set of runtime objects. The program further includes instructions to compare the second fingerprint to the first fingerprint. The program further includes instructions to determine whether the first set of runtime objects is valid based on the comparing of the second fingerprint to the first fingerprint. The program further includes instructions to deploying the first set of runtime objects to a target system. The deployment is based on the determination of whether the first certificate is valid and the determination of whether the first set of runtime objects is valid.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein. As used herein, the terms "first," "second," "third," "fourth," etc. may be used for differentiating between similarly named elements or objects and may not necessarily indicate an ordering of the elements or objects.

As mentioned above, complex software development processes may involve numerous iterations of planning, designing, building, and testing of the software before the release and deployment of the software. Furthermore, even once the software has been released, software development may continue in order to maintain and upgrade the software. Such maintenance and upgrades may also involve numerous iterations of planning, designing, building, and testing of the software updates before they are released and deployed. In some situations, there may be weeks or months between software updates are released, with each update may including numerous different runtime packages to be updated, where each runtime package may be based on different design-time objects. Given this situation, it may be difficult to keep track of which runtime objects are to be deployed for a particular software release or update and it may be difficult to ensure that the runtime objects are complete and correct. The software deployment certification process described herein addresses these issues.

Figure 1:
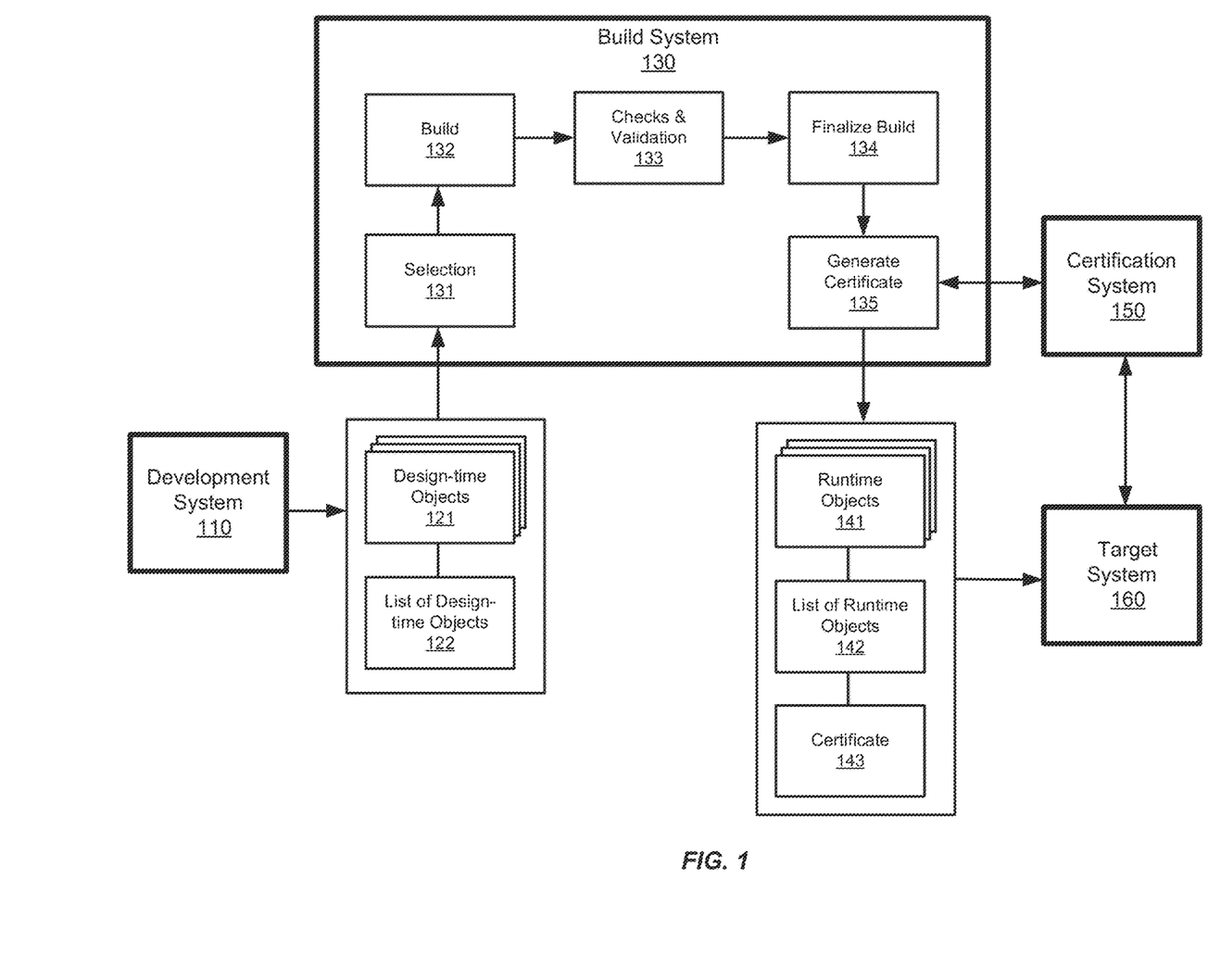
FIG. 1 shows a diagram of a development system, a build system, a certification system, and a target system, according to an embodiment.

FIG. 1 shows a diagram of a development system 110, a build system 130, a certification system 150, and a target system 160, according to an embodiment. The build system 130 and the certification system 150 protect the runtime objects 141 from unauthorized changes by generating a certificate 143 that can be used to validate the runtime objects 141. The certification process also allows for reporting and tracking of checks and validations. The certification described herein may be applied to critical software deployments contexts in order to ensure that the deployed software is complete and unaltered.

The development system 110 may be used to generate design-time objects 121 (e.g., source code files) and a reference list 122 indicating all changed design-time objects and artifacts (e.g., models, diagrams, and documents describing the objects or software). In some cases, the design-time objects 121 and the list 122 may be created over time and across multiple design iterations. In some embodiments, the development system 120 may be a front-end user interface to a back-end server computer. In some embodiments, the development system 120 may comprise one or more a desktop computers, user devices, and/or a server computers in communication with each other. In some embodiments, the design-time objects 121 and the list 122 may be stored at the development system 110 (e.g., in a memory or a storage drive). In other embodiments, the design-time objects 121 and the list 122 may be stored on a remote server (e.g., a shared file server) in communication with the development system 120.

Overtime, new and changed design-time objects 121, including any design artifacts, and the reference list 122 indicating all changed design-time objects and artifacts are collected before they are built by the build system 130. The build system 130 may comprise one or more computers or severs. In some embodiments, the build system 130 and the development system 110 may be part of the same computer system. After the development finishes in the development system context, the changed design-time objects 121 may be used as input for a selective build process at the build system 130. The build system 130 obtains the new and changed design-time objects 121, including any design artifacts, and the reference list 122 indicating all changed design-time objects and artifacts. The design-time objects 121 and the list 122 may be obtained from the development system 110 or from a different system (e.g., a shared file server).

The software build process involves selection 131 of a set (e.g., one or more) of the new and changed design-time objects 121 to be built. In some embodiments, the selection 131 may be performed by a user of the build system 130 (e.g., a user interacting with a front-end to the build system 130). In some embodiments, the selection 131 may be performed automatically by the build system 130. In some embodiments, the selection 131 may be predetermined by a user.

Once any selection 131 of the design-time objects 121 is performed, the selected design-time objects 121 are used in a build process 132 that creates a set of runtime objects and artifacts 141, along with a list 142 of the runtime objects 141. In some embodiments, the build process 132 may be configured and customized for a particular target system or a set of target systems. The runtime objects and artifacts 141 may be deployed to the target system and executed by the target.

After the runtime objects and artifacts 141 are created, the build system 130 may perform checks and validation 132 process on the runtime objects and artifacts 141. The checks and validation process 132 may determine whether the runtime objects 141 access application programing interfaces (APIs) that are restricted or banned, access memory without sufficient permissions, perform full table scans of a database, or perform certain other operations without authorization, for example.

After performing the checks and validation 133, the build system 130 may finalize the build 134. Finalization of the build 134 may involve copying files or data from one location to another location, reformatting files or data, or orchestrating the build output, for example.

Thus, when the build 132 is performed, the build system 130 may create the runtime objects and artifacts 141 and a list 142 of the runtime objects 141. In addition, the build system 130 may also generate a certificate 143. The certificate 143 may include information on what was built, when, by whom, and which checks have been performed, as further described below. The certificate 143 may be provided to a central certification system 150 in order to secure later verifications of the certificate 143 (e.g., to detect modifications to the certificate 143 or the set of runtime objects 141).

In some embodiments, the runtime objects 141, the list of runtime objects 142, and the certificate 143 may be stored at the build system 130 (e.g., in a memory or a storage drive). In other embodiments, the runtime objects 141, the list of runtime objects 142, and the certificate 143 may be stored on a remote server (e.g., a shared file server) in communication with the development system 120. In some embodiments, the remote server may also be storing the design-time objects 121 and the list of design-time objects 122.

The certification system 150 may comprise one or more computers or severs. In some embodiments, the certification system 150 may be part of the same computer system as the build system, 130 and/or the development system 110. In some embodiments, the certification system 150 may perform the generation of the certificate 143 instead of the build system 150. In such embodiments, the certification system 150 may receive obtain the runtime objects and artifacts 141 and a list 142 to use in generating the certificate 143.

When a deployment process is initiated for the target system 160, the target system 160 may obtain the runtime objects 141, the list of runtime objects 142, and the certificate 143. The target system 160 may communicate with the certification server 150 to validate the content of the certificate 143, which can be used to determine whether the runtime objects 141 are valid (e.g., complete, correct, and unmodified) such that they can be deployed. The structure and information included in the certificate 143 is further described below.

Features and advantages of the improved software build and certification process include the ability to protect and validate the runtime objects using the certificate, thereby ensuring that the runtime objects for deployment to a target system match the runtime objects created by the build system. This improves upon certain prior software build and deployment process that may not ensure that the runtime objects to be deployed have not changed or been tampered with. The lack of traceability in such prior software build and deployment processes poses a high risk to critical software systems. Without the improved software build and certification process described here, computing resources may be wasted in deploying and installing runtime objects that have become corrupted. Or worse, the runtime objects may have been modified without authorization.

Figure 2:
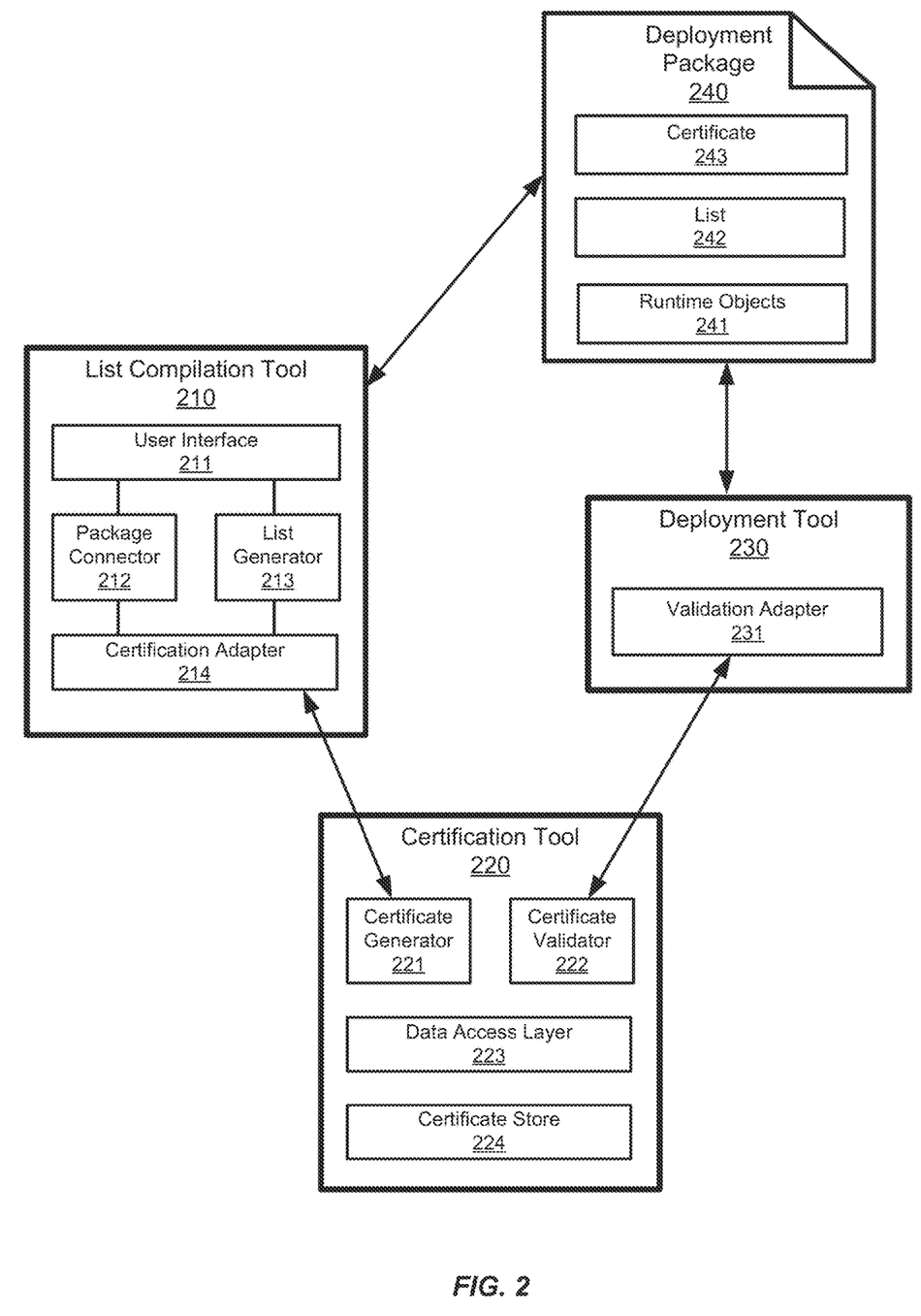
FIG. 2 shows a remote certification process, according to an embodiment.

As discussed above, a build process may generate a set of runtime objects and a list of the runtime objects. A certificate may be generated for validating the set of runtime objects. FIG. 2 shows a remote certification process, according to an embodiment. The remote certification process involves various software components, including a list complication tool 210, a certification tool 220, and a deployment tool 230. In some embodiments, these software components may be executed by different computer systems. For example, the list compilation tool 210 may be executed by a build system, the certification tool 210 may be executed by a certification system, and the deployment tool may be executed by a deployment system or a target system. In some embodiments, one or more of these software components may be executed by the same computer, server, or computer system (e.g., an application server).

The list compilation tool 210 may be used by a user during a software build process, such as the one described above. The user may interact with the list compilation tool 210 using a user interface 221. The list compilation tool may provide a front-end for the user for building and compiling design-time objects and artifacts into runtime objects and artifacts, using the package connector component 212 for example. A list generator component 213 may be used to generate a list of the runtime objects, for example.

The list compilation tool 210 also includes a certification adapter component 213 that is configured to connect or communicate with a certification tool 220. The certification tool 220 may be executed by a certification server, for example. The certification adapter 214 may sent a request to generate certificate files that can be stored locally. The certification tool 220 may generate a certificate, using a certificate generator component 221, based on the runtime objects. The certification tool 220 may access the runtime objects using a data access layer component 223. For example, the runtime objects may be obtained from a build server or from a shared file server. The certificate may be stored by a certificate store component 224. The certificate tool 220 may persist all of the certification data for later validation of certificates.

Deployment of software may be performed using a deployment package 240 including a set of runtime objects 241, a list 242 of the runtime objects, and a certificate 243 generated based on the runtime objects 241 and the list 242. During deployment of runtime objects, the deployment tool 230 may read its local certificate 243 provided along with the runtime objects 241. A validation adapter component 231 of the deployment tool 230 may communicate with a certificate validator component 222 of the certification tool 220. The validation adapter component 231 of the deployment tool 230 may request the certificate validator 222 to validate the local certificate at the deployment tool 230. The deployment tool 230 may send the certificate to the certificate validator 222. The certificate validator 222 may compare the received certificate to a certificate stored by the certificate store 224. In some embodiments, the certificates may include a token uniquely identifying the certificate. The certificate validator 222 may identify the stored certificate corresponding to the received certificate based on the tokens of the two certificates. The certification validator 222 may send a response to the deployment tool 230 indicating whether the certificate at the deployment tool 230 is valid or invalid.

In some embodiments, the deployment tool 230 may also validate whether a fingerprint in the certificate 243 is valid. The certificate 243 may be generated based on the set of runtime objects 241 and the list of runtime objects 242. The fingerprint may be used to determine whether the runtime objects 241 are correct and whether the list 242 is as expected. Depending on the result of this validation, the deployment tool 230 may abort the deployment process if the certificate 243 or the set of runtime objects 241 are invalid, which may indicate that the content of the runtime objects 241, the list of runtime objects 242, or the certificate 243 have been corrupted or manipulated. Thus, the certificate 243 enables the set of runtime objects for deployment to be secured and enables a corrupted or unauthorized deployment to be aborted.

As discussed above, the deployment tool 230 may validate the deployment package 240 by communicating with the certification tool 220. However, in some embodiments, the deployment tool 230 may not be able to connect to or communicate with the certification tool 220. In such cases, the deployment tool 230 may perform local validation of the certificate 243 and the set of runtime objects 241. For example, the validation adapter 231 may check information in the certificate and execute consistency tests. For example, a fingerprinting algorithm indicated by the certificate 243 may be used to re-generate the fingerprint included in the certificate 243, which may be used to validate the set of runtime objects 241.

The certificate may include data describing different aspects of the list of objects for later deployment. To create a clear relation between the certificate and the list of objects, the list is fingerprinted. A fingerprint may be generated using a hashing algorithm based on the content of the runtime objects. For example, the fingerprint may be a single hash generated based on generated hashes of the runtime objects concatenated according to their order in the list of runtime objects. The format of the certificate may be textual or binary. In some embodiments, many certificates may be joined in a single certificate file. All information within the certificate may be persisted by the certification tool for later verification. The certificate may also contain information on checks executed during the build process, list statistics, origins, the certification server, and any other relevant details varying by use case and platform. An exemplary certificate is shown in table 1 below.

TABLE 1

| Certificate | | | | |
|---|---|---|---|---|
| fingerprint | 'KEJKEJKWJEWJEWJEIJ' | | | |
| token | 'AJKSJKSJKJS' | | | |
| algorithm | 'AS1' | | | |
| filename | 'BUFFER_XY.OD' | | | |
| date | '2018-03-20' | | | |
| creator | 'me' | | | |
| app | 'SUPING' | | | |
| transaction | 'SUPGINT' | | | |
| transaction system | 'YI3' | | | |
| target system | 'VBZ' | | | |
| payload | stats | lines | 10 | |
| | | last | 100 | |
| | | ctc | true | |
| | checks | 0 | name | 'A check' |
| | | | result | 'success' |
| | | | ignore | false |
| | | 1 | | |

As shown in table 1, the example certificate may include or indicate a fingerprint, a token, an algorithm, a file name, a date, a creator, an app, a transaction, a transaction system, a target system, and a payload. While the example certificate is shown as a table, the certificate may be formatted as a binary file or as a text file.

The "fingerprint" data in the certificate may be based on the set of runtime objects. The fingerprint may uniquely identify the set of runtime objects and condense this information into a fixed length hex string. If the set of runtime objects changes from those that were built, the resulting fingerprint may change.

The "token" data in the certificate may be used for validation of the certificate. For example, a certification tool or certificate server generating the certificate may generate the token so that it knows that the certificate was generated by itself. Thus, the token may be used by the certification tool to authenticate that it generated this certificate. As such, the token may act as a passphrase that is unique for that certificate. In some embodiments, the token may be generated by hashing some or all of the other content that is in the certificate. The certificate tool may reference and authenticate the token when performing remote certification as discussed above. The certificate tool may use the token to identify a stored certificate corresponding to a certificate received from the deployment tool in a certification request. The certificate tool may validate the received certificate based on a comparison with the corresponding stored certificate, where the received certificate is valid if they match.

The "algorithm" data in the certificate may indicate the algorithm used for generating the fingerprint (e.g., a particular hashing algorithm). As such, the fingerprint may be re-generated using the hashing algorithm and the set of runtime objects. The re-generated fingerprint may be compared to the original fingerprint in the certificate in order to validate the set of runtime objects. If the re-generated fingerprint matches the fingerprint in the certificate, this may indicate that the set of runtime objects has not changed.

The "creator" data in the certificate may be a user name of a user that triggered or initiated the build process.

The "app" and "transaction" data in the certificate may indicate the application used to trigger the build process (e.g., 'SUPING') and the user interface used (e.g., 'SUPGINT'). These may be an application and a user interface provided by the build system or the development system, for example. In some embodiments, there may be different build systems for building the same sets of runtime objects.

The "target system" data in the certificate identifies the target system for the deployment.

The "payload" data may indicate which checks were performed during the build process.

When the certificate is validated, either by a remote certification tool or locally by the deployment tool or target system, each piece of information in the certificate may be validated against a predetermined value. In some embodiments, all of the information in the certificate may be validated.

Figure 3:
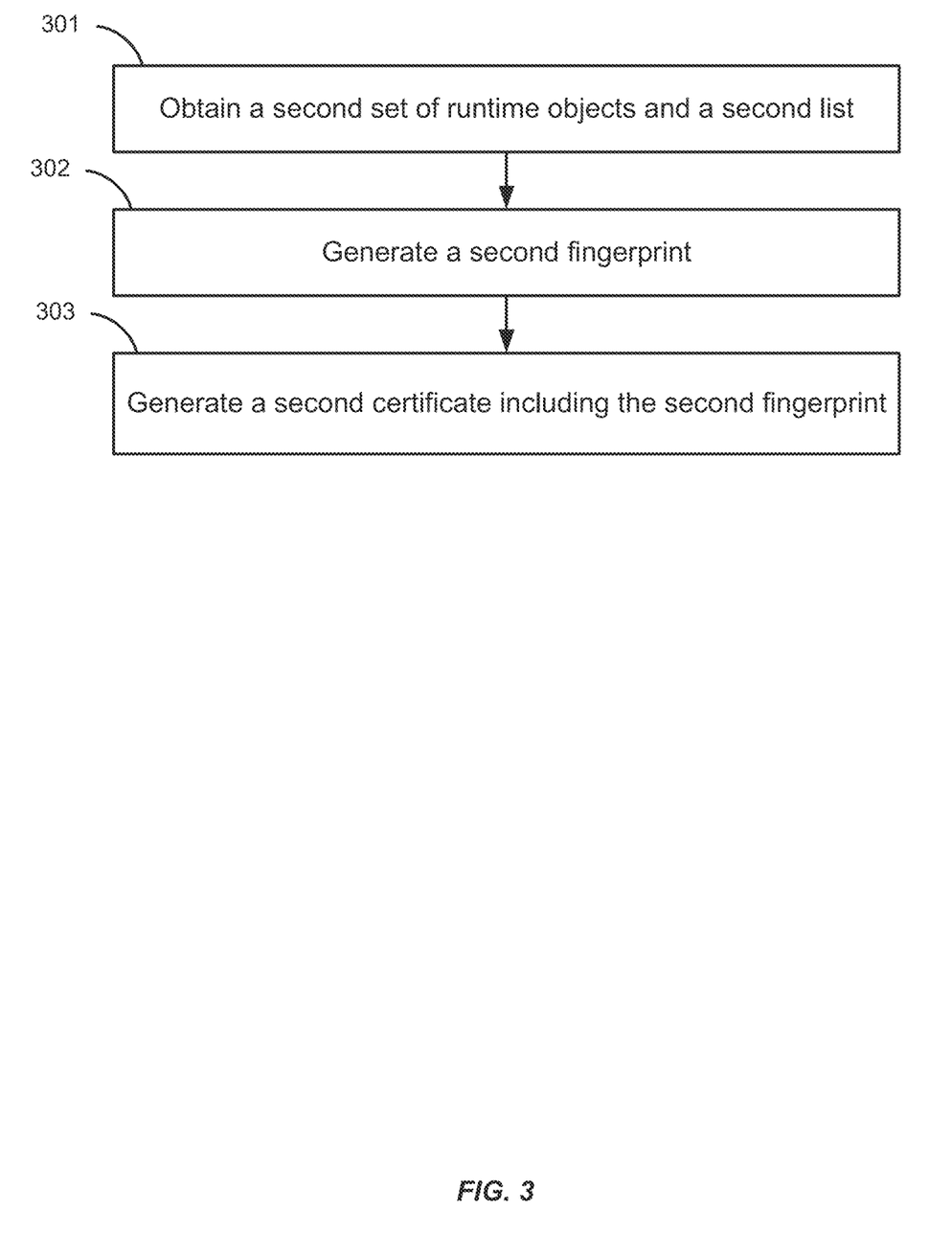
FIG. 3 shows a flowchart of a certificate generation process, according to an embodiment.

As discussed above, the certificate may be generated by a certification tool, a certification system, or a build system. FIG. 3 shows a flowchart of a certificate generation process, according to an embodiment.

At 301, the process includes obtaining a second set of runtime objects and a second list. Herein, the term "second" is used to differentiate from a "first" set of runtime objects and a "first" list that may be used by a deployment tool. The second list may identify the second set of runtime objects. The second set of runtime objects may have been generated using a third set of design-time objects (e.g., design-time objects selected by a user of the build system or the list compilation tool). In some embodiments, the process may include obtaining the third set of design-time objects and then generating the second set of runtime objects and the second list of runtime objects based on the third set of design-time objects.

At 302, the process includes generating a second fingerprint based on the second list and the second set of runtime objects. In some embodiments, the process further includes obtaining one or more object fingerprints. The one or more object fingerprints may be generated using a fingerprint algorithm. An object fingerprint may be generated for each runtime object identified by the second list. The process may include joining the one or more object fingerprints based on the second list to form a joined object fingerprint. In such embodiments, the generating of the second fingerprint may be further based on the joined object fingerprint.

In some embodiments, the process further includes obtaining a second set of build checks. The build checks may indicate checks and validations performed during the build process The second set of build checks may identify checks (e.g., checks and validation 133 in FIG. 1) performed by a build component on the second set of runtime objects. In such embodiments, the second certificate may include the second set of build checks.

In some embodiments, the process further includes obtaining a build-system identifier identifying a build component that generated the second set of runtime objects (e.g., an identifier of the build system or an identifier of a list compilation tool). In such embodiments, the second certificate may include the build-system identifier.

In some embodiments, the process includes obtaining a target-system identifier identifying a target system for deployment of the second set of runtime objects. In such embodiments, the second certificate may include the target-system identifier.

At 303, the process includes generating a second certificate including the second fingerprint. The second certificate may be usable (e.g., by a deployment tool as discussed above) to determine whether the second set of runtime objects is valid based on the second fingerprint.

In some embodiments, the process includes sending the second certificate to a certification component (e.g., a certification system or certification tool, as discussed herein). In such embodiments, the second certificate may further includes a token uniquely identifying the certificate. In some embodiments, the token may be generated by the certification component. The certification component may be configured to store the second certificate. The certification component may also be configured to re-generate the token based on the second certificate. The certification component may also be configured to validate other certificates including the token based on a comparison with the second certificate (e.g., certificates received from a deployment tool, as discussed herein).

Figure 4:
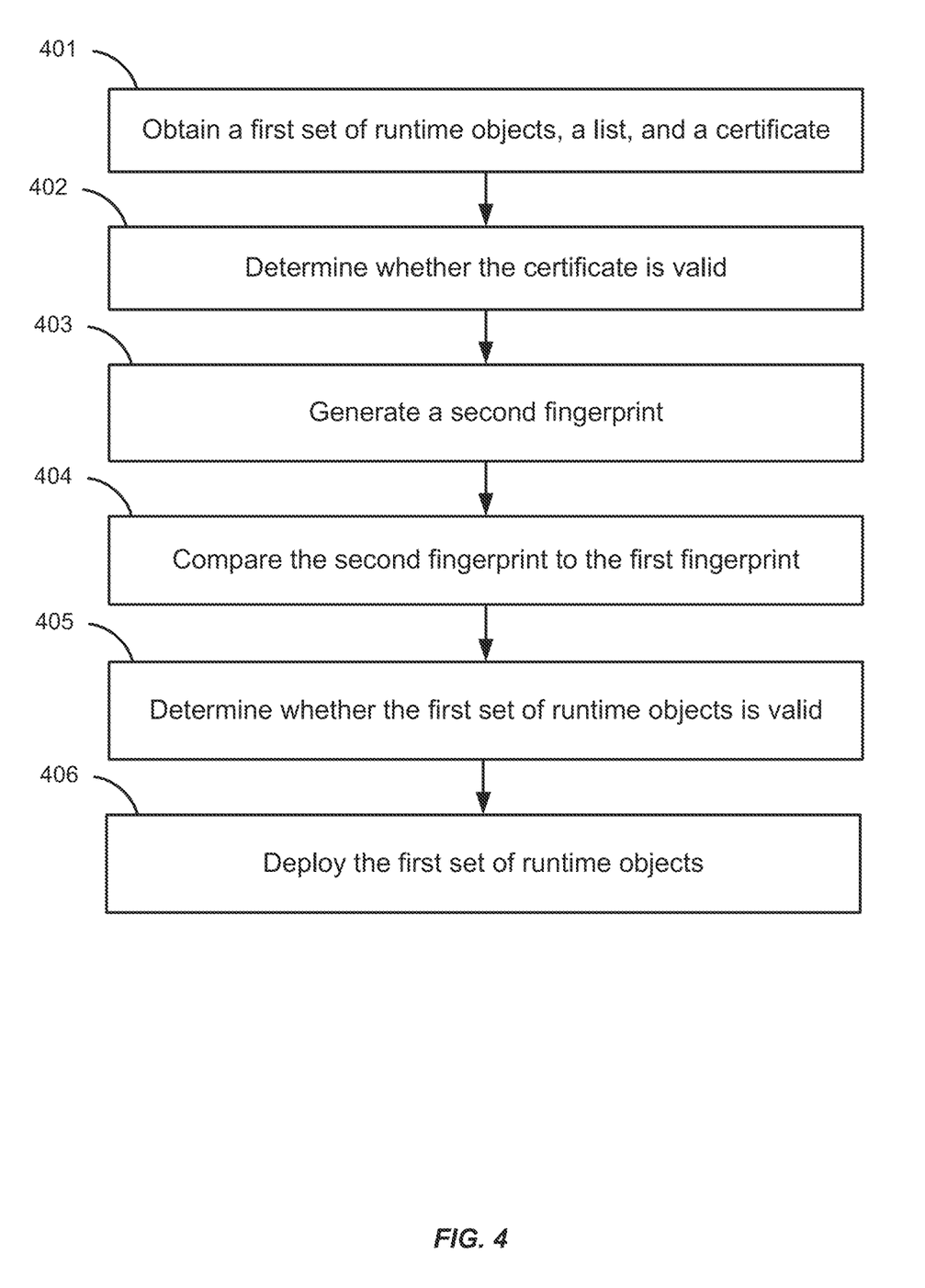
FIG. 4 shows a flowchart of a deployment process, according to an embodiment.

As discussed herein, a certificate may be used to validate a set of runtime objects for deployment. FIG. 4 shows a flowchart of a deployment process, according to an embodiment.

At 401, the process includes obtaining a first set of runtime objects for a software application, a first list of runtime objects, and a first certificate including a first fingerprint.

At 402, the process includes determining whether the first certificate is valid. In some embodiments, the process includes sending a certificate validation request including the certificate to a certification component. In such embodiment, the process may further include receiving a certificate validation response from the certification component. The certificate validation response may indicate whether the certificate is valid. In some embodiments, the deploying of the first set of runtime objects to the target system may be based on the certificate being valid. Validity of the first certificate may indicate that the first certificate matches a second certificate. The second certificate may be stored at the certification component, as discussed herein.

At 403, the process includes generating a second fingerprint based on the first list and the first set of runtime objects. In some embodiments, the process further includes determining a fingerprint algorithm from the certificate. In some embodiments, the process further includes obtaining one or more object fingerprints by generating, using the fingerprint algorithm, an object fingerprint for each runtime object identified by the first list. In some embodiments, the process may further include joining the one or more object fingerprints based on the first list to form a joined object fingerprint. In such embodiments, the generating of the second fingerprint may use the fingerprint algorithm and may be based on the joined object fingerprint. The first fingerprint may match the second fingerprint if the first set of runtime objects matches the second set of runtime objects and if the first list matches the second list.

At 404, the process includes comparing the second fingerprint to the first fingerprint. The comparison may be used to determine whether the second fingerprint matches the first fingerprint (e.g., they are the same hash or the same hex string).

At 405, the process includes determining whether the first set of runtime objects is valid based on the comparing of the second fingerprint to the first fingerprint. Validity of the first set of runtime objects may indicate that the first set of runtime objects matches a second set of objects. The second set of runtime objects may have been generated using a third set of design-time objects (e.g., by a build tool or build system, as discussed herein). The second certificate may have been generated using the second set of runtime objects (e.g., the set of runtime objects created by the build tool or system).

At 406, the process includes deploying the first set of runtime objects to a target system. The deployment may be based on the determination of whether the first certificate is valid and the determination of whether the first set of runtime objects is valid.

In some embodiments, the process further includes determining a first set of build checks from the certificate. The first set of build checks identifying checks may have been performed by a build component on the first set of runtime objects (e.g., during a build processes as discussed above). In such embodiments, the process may further include determining whether the first set of build checks matches a required set of build checks. In such embodiments, the determination of whether the first set of runtime objects are valid may be based on the determination of whether the first set of build checks matches the required set of build checks.

In some embodiments, the process further includes determining a build-system identifier from the certificate. In such embodiments, the process may further include determining whether the build-system identifier matches an expected build-system identifier.

In some embodiments, the process includes determining a target-system identifier from the certificate. In such embodiments, the process may further include determining whether the target-system identifier matches the target system. In such embodiments, the deployment of the first set of runtime objects to the target system may be based the determination of whether the build-system identifier matches the expected build-system identifier and the determination of whether the target-system identifier matches the target system.

In some embodiments, the deployment of the first set of runtime objects to the target system includes provisioning the first set of runtime objects to the target system. In some embodiments, the deployment further includes initiating activation or installation of the first set of runtime objects such that the target system is configured to execute the software application using the first set of runtime objects.

As discussed above, software tools may be used to direct the build, validation, and deployment processes. For instance, a build tool may be used to build design-time objects into runtime objects, a certification tool may be used to generate a certificate, and a deployment tool may be used to deploy software to a target system. In some embodiments, these tools may be combined together in the same system providing a user interface for operating these tools.

Figure 5:
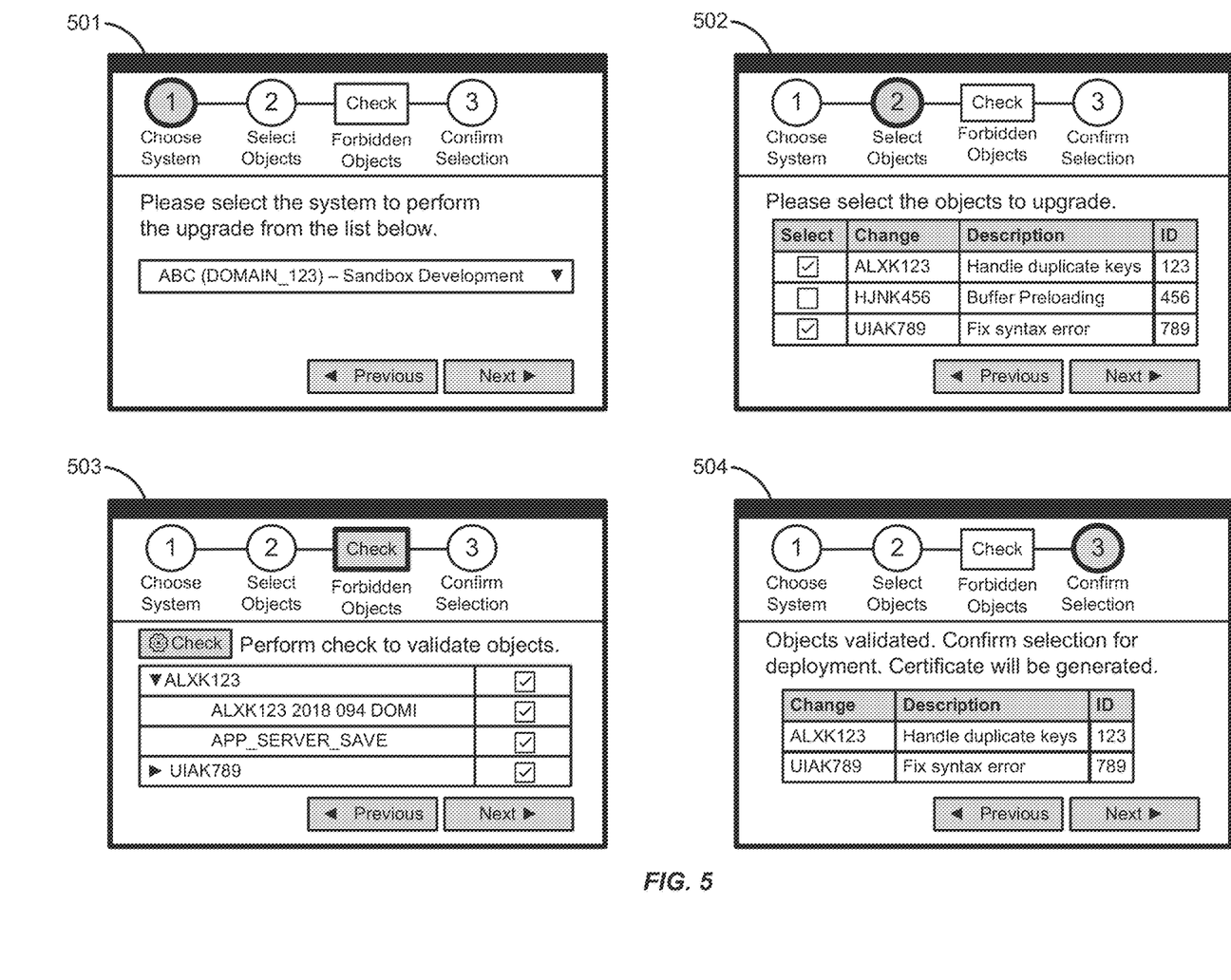
FIG. 5 show example user interfaces for deploying software, according to an embodiment.

FIG. 5 show example user interfaces for deploying software, according to an embodiment. A first user interface 501 may enable the user to select a particular target system to have its software upgraded (e.g., updated to a more recent version of the software).

A second user interface 502 of the deployment tool may be used to select a particular set of objects or packages of objects to be built and deployed to the target system.

A third user interface 503 may enable the user to build or create runtime objects from design-time objects and perform checks to validate the runtime objects.

A fourth user interface 504 may see confirmation that the objects were validated. The user may also confirm the selection of the objects for deployment. The user may also use the fourth user interface 504 to initiate generation of the certificate and initiate deployment of the selected objects to the target system.

The certificate process described here provides features and advantages over prior software deployment processes. For instance, the certification process provides the ability to protect and validate the runtime objects using the certificate, thereby ensuring that the runtime objects for deployment to a target system match the runtime objects created by the build system. This improves upon certain prior software build and deployment process that may not ensure that the runtime objects to be deployed have not changed or tampered. The lack of traceability in such prior software build and deployment processes poses a high risk to critical software systems. Without the improved software build and certification process described here, computing resources may be wasted in deploying and installing runtime objects that have become corrupted or modified without authorization.

In addition, the certification process provides improved security and traceability aspects for software build and deployment processes. The certification process also allows for both remote validation (e.g., by a certification tool, as discussed above) and local validation (e.g., by the deployment tool, as discussed above). Furthermore, the certification process is automated and may be performed without specific input from the user of the deployment tool. In addition, the certification process is flexible and open to use-case specific data, and it may be ported to various platforms.

Figure 6:
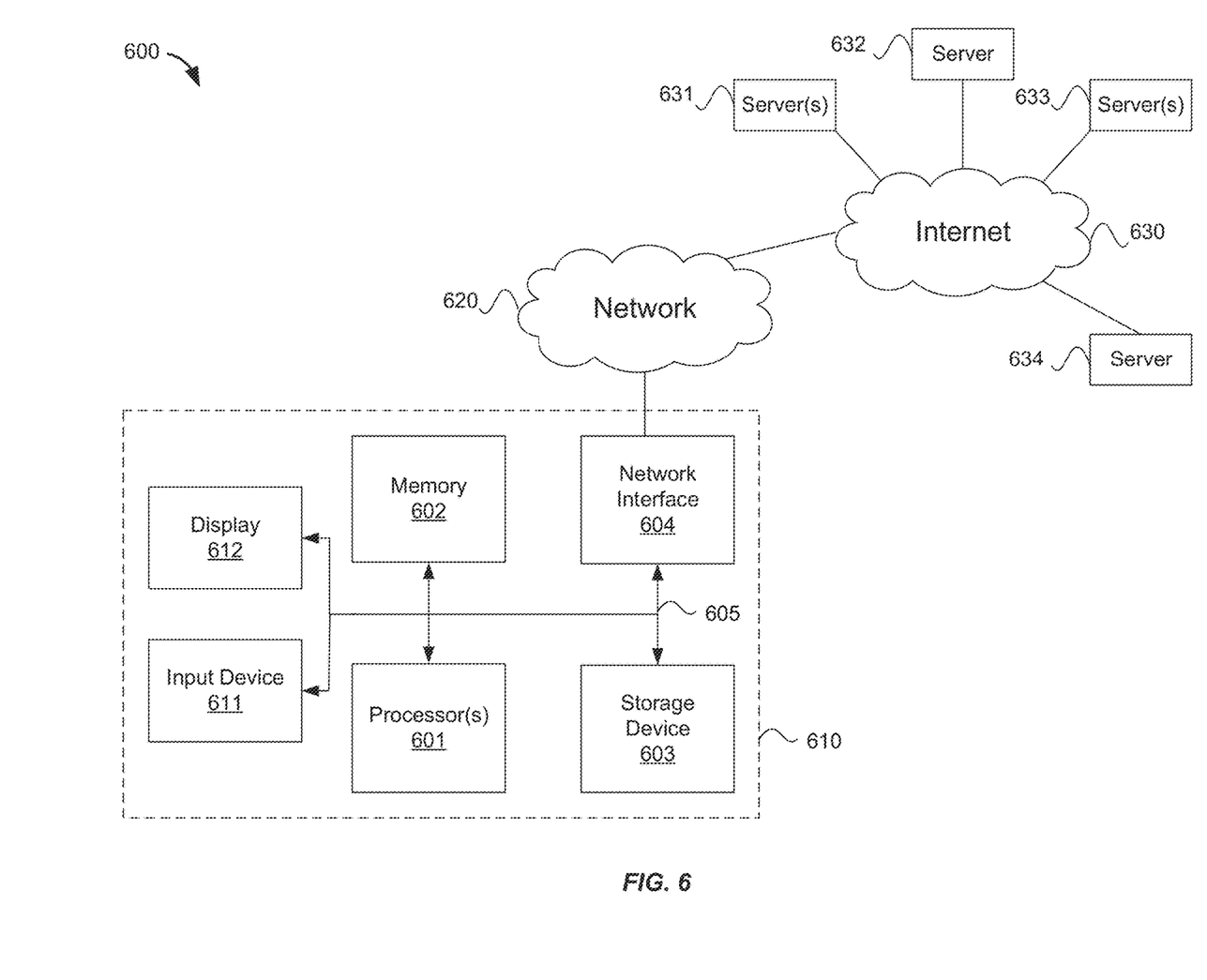
FIG. 6 shows a diagram of hardware of a special purpose computing machine for implementing systems and methods described herein.

FIG. 6 shows a diagram of hardware of a special purpose computing machine for implementing systems and methods described herein. The following hardware description is merely one example. It is to be understood that a variety of computers topologies may be used to implement the above described techniques. An example computer system 610 is illustrated in FIG. 6. Computer system 610 includes a bus 605 or other communication mechanism for communicating information, and one or more processor(s) 601 coupled with bus 605 for processing information. Computer system 610 also includes a memory 602 coupled to bus 605 for storing information and instructions to be executed by processor 601, including information and instructions for performing some of the techniques described above, for example. This memory may also be used for storing programs executed by processor(s) 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 603 may include source code, binary code, or software files for performing the techniques above, for example. Storage device and memory are both examples of non-transitory computer readable storage mediums.

Computer system 610 may be coupled via bus 605 to a display 612 for displaying information to a computer user. An input device 611 such as a keyboard, touchscreen, and/or mouse is coupled to bus 605 for communicating information and command selections from the user to processor 601. The combination of these components allows the user to communicate with the system. In some systems, bus 605 represents multiple specialized buses, for example.

Computer system also includes a network interface 604 coupled with bus 605. Network interface 604 may provide two-way data communication between computer system 610 and a network 620. The network interface 604 may be a wireless or wired connection, for example. Computer system 610 can send and receive information through the network interface 604 across a local area network, an Intranet, a cellular network, or the Internet, for example. In the Internet example, a browser, for example, may access data and features on backend systems that may reside on multiple different hardware servers 631-634 across the network. The servers 631-634 may be part of a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer-implemented method, comprising:
    obtaining a first set of runtime objects for a software application, a first list of runtime objects, and a first certificate including a first fingerprint;
    determining whether the first certificate is valid;
    generating a second fingerprint based on the first list and the first set of runtime objects;
    comparing the second fingerprint to the first fingerprint;
    determining whether the first set of runtime objects is valid based on the comparing of the second fingerprint to the first fingerprint; and
    deploying the first set of runtime objects to a target system based on the determining of whether the first certificate is valid and the determining of whether the first set of runtime objects is valid.

2. The computer-implemented method of claim 1, further comprising:
    determining a fingerprint algorithm from the certificate;
    obtaining one or more object fingerprints by generating, using the fingerprint algorithm, an object fingerprint for each runtime object identified by the first list; and
    joining the one or more object fingerprints based on the first list to form a joined object fingerprint, wherein the generating the second fingerprint uses the fingerprint algorithm and is based on the joined object fingerprint, wherein the first fingerprint matches the second fingerprint if the first set of runtime objects matches the second set of runtime objects and if the first list matches the second list.

3. The computer-implemented method of claim 1, wherein validity of the first certificate indicates that the first certificate matches a second certificate, and wherein validity of the first set of runtime objects indicates that the first set of runtime objects matches a second set of objects, the second set of runtime objects generated using a third set of design-time objects, the second certificate generated using the second set of runtime objects.

4. The computer-implemented method of claim 1, further comprising:
    sending a certificate validation request including the certificate to a certification component; and
    receiving a certificate validation response from the certification component, the certificate validation response indicating whether the certificate is valid, wherein the deploying of the first set of runtime objects to the target system is based on the certificate being valid.

5. The computer-implemented method of claim 1, further comprising:
    determining a first set of build checks from the certificate, the first set of build checks identifying checks performed by a build component on the first set of runtime objects; and
    determining whether the first set of build checks matches a required set of build checks, wherein the determining of whether the first set of runtime objects are valid is based on the determining of whether the first set of build checks matches the required set of build checks.

6. The computer-implemented method of claim 1, further comprising:
    determining a build-system identifier from the certificate;
    determining whether the build-system identifier matches an expected build-system identifier;
    determining a target-system identifier from the certificate; and
    determining whether the target-system identifier matches the target system;
    wherein the deploying of the first set of runtime objects to the target system is based the determining of whether the build-system identifier matches the expected build-system identifier and the determining of whether the target-system identifier matches the target system.

7. The computer-implemented method of claim 1, wherein the deploying of the first set of runtime objects to the target system includes provisioning the first set of runtime objects to the target system and initiating activation or installation of the first set of runtime objects such that the target system is configured to execute the software application using the first set of runtime objects.

8. A non-transitory machine-readable medium storing a program executable by at least one processing unit of a device, the program comprising sets of instructions for:
obtaining a first set of runtime objects for a software application, a first list of runtime objects, and a first certificate including a first fingerprint;
determining whether the first certificate is valid;
generating a second fingerprint based on the first list and the first set of runtime objects;
comparing the second fingerprint to the first fingerprint;
determining whether the first set of runtime objects is valid based on the comparing of the second fingerprint to the first fingerprint; and
deploying the first set of runtime objects to a target system based on the determining of whether the first certificate is valid and the determining of whether the first set of runtime objects is valid.

9. The non-transitory machine-readable medium of claim 8, wherein the program further comprises sets of instructions for:
determining a fingerprint algorithm from the certificate;
obtaining one or more object fingerprints by generating, using the fingerprint algorithm, an object fingerprint for each runtime object identified by the first list; and
joining the one or more object fingerprints based on the first list to form a joined object fingerprint, wherein the generating the second fingerprint uses the fingerprint algorithm and is based on the joined object fingerprint, wherein the first fingerprint matches the second fingerprint if the first set of runtime objects matches the second set of runtime objects and if the first list matches the second list.

10. The non-transitory machine-readable medium of claim 8, wherein validity of the first certificate indicates that the first certificate matches a second certificate, and wherein validity of the first set of runtime objects indicates that the first set of runtime objects matches a second set of objects, the second set of runtime objects generated using a third set of design-time objects, the second certificate generated using the second set of runtime objects.

11. The non-transitory machine-readable medium of claim 8, wherein the program further comprises sets of instructions for:

sending a certificate validation request including the certificate to a certification component; and
receiving a certificate validation response from the certification component, the certificate validation response indicating whether the certificate is valid, wherein the deploying of the first set of runtime objects to the target system is based on the certificate being valid.

12. The non-transitory machine-readable medium of claim 8, wherein the program further comprises sets of instructions for:
determining a first set of build checks from the certificate, the first set of build checks identifying checks performed by a build component on the first set of runtime objects; and
determining whether the first set of build checks matches a required set of build checks, wherein the determining of whether the first set of runtime objects are valid is based on the determining of whether the first set of build checks matches the required set of build checks.

13. The non-transitory machine-readable medium of claim 8, wherein the program further comprises sets of instructions for:
determining a build-system identifier from the certificate;
determining whether the build-system identifier matches an expected build-system identifier;
determining a target-system identifier from the certificate; and
determining whether the target-system identifier matches the target system; wherein the deploying of the first set of runtime objects to the target system is based the determining of whether the build-system identifier matches the expected build-system identifier and the determining of whether the target-system identifier matches the target system.

14. The non-transitory machine-readable medium of claim 8, wherein the program further comprises sets of instructions for:
wherein the deploying of the first set of runtime objects to the target system includes provisioning the first set of runtime objects to the target system and initiating activation or installation of the first set of runtime objects such that the target system is configured to execute the software application using the first set of runtime objects.

* * * * *